United States Patent [19]

Aldenhoven

[11] Patent Number: 4,665,451
[45] Date of Patent: May 12, 1987

[54] SERVO WITH IMPULSE RELAY FOR A MAGNETIC-TAPE-CASSETTE APPARATUS

[75] Inventor: Ghislanus M. A. M. Aldenhoven, Eindhoven, Netherlands

[73] Assignee: U.S. Philips Corporation, New York, N.Y.

[21] Appl. No.: 751,354

[22] Filed: Jul. 2, 1985

[30] Foreign Application Priority Data

Jul. 6, 1984 [NL] Netherlands .......................... 8402145

[51] Int. Cl.⁴ ............................................ G11B 15/00
[52] U.S. Cl. ........................................ 360/90; 260/93; 260/96.1
[58] Field of Search ................. 360/90, 93, 96.1, 96.3, 360/96.5, 105

[56] References Cited

U.S. PATENT DOCUMENTS

| 4,378,578 | 3/1983 | Shiozu et al. | 360/96.3 X |
| 4,519,269 | 5/1985 | Takai et al. | 360/96.1 X |
| 4,523,241 | 6/1985 | Ito et al. | 360/105 |

Primary Examiner—John H. Wolff
Attorney, Agent, or Firm—David R. Treacy

[57] ABSTRACT

The head-mounting plate of a cassette apparatus is positioned, in part, through the operation of a servo having a motor-driven servo wheel whose rotation is initiated by pulsed operation of an impulse relay. The servo wheel has teeth around its circumference except for two portions defining wheel rest positions. In the rest position of the wheel, a starting torque is applied by pressure on a cam on the wheel, rotation being prevented by a latching arrangement. The impulse relay is engaged by a relay-armature member which has an elastically deflectable arm and a rigid arm, the end of the elastically deflectable arm having a rigid support for a soft iron element which can be attracted to the impulse relay, and a coupling element which couples the elastically deflectable arm to the rigid arm, so that movement of the rigid arm in one direct is prevented by the engagement with the relay. Deflection of the deflectable arm permits movement of the relay-armature member through an additional pivotal movement toward the latching relay. In the latching position of the relay-armature member, a stop on the member abuts a latching projection on the servo wheel to keep the wheel in a latched position. An impulse energization of the impulse relay releases the soft iron element, and a spring pivots the relay-armature member to an inoperative position in which the servo wheel is freed to rotate under the influence of the starting torque, so that the circumferential teeth mesh with a drive pinion connected to a drive motor which may be constantly rotating. A reset projection on the relay-armature member is actuated by the latching projection for pivoting the member back to the latching position so that the latching projection can abut the stop when the servo wheel has again reached the rest position.

9 Claims, 6 Drawing Figures

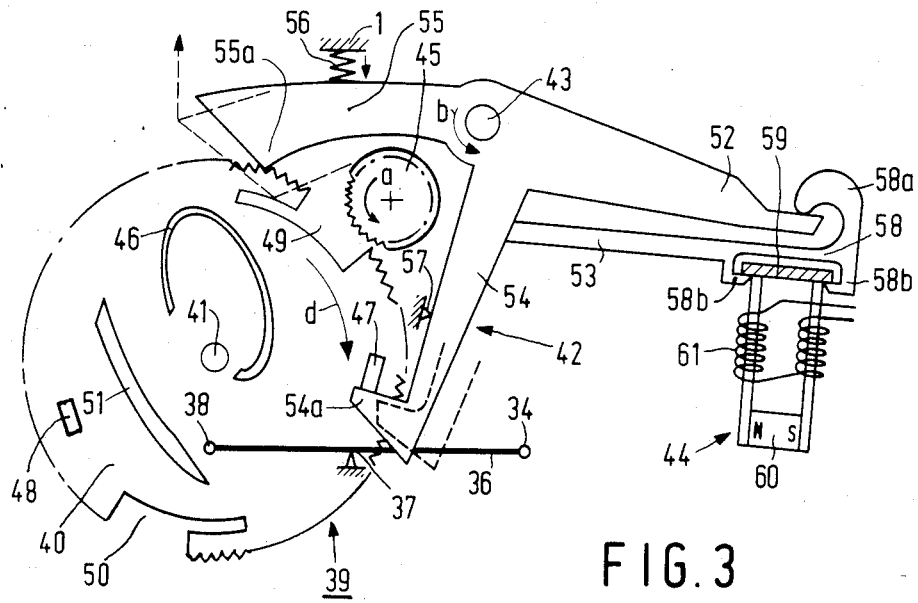
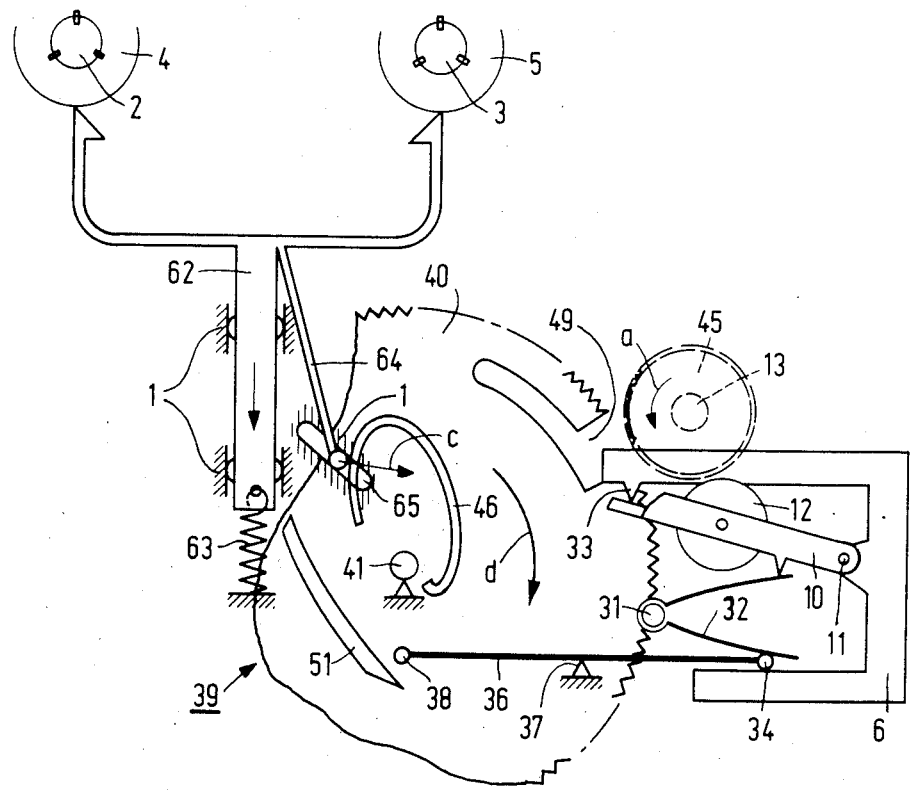
FIG.3
FIG.4

SERVO WITH IMPULSE RELAY FOR A MAGNETIC-TAPE-CASSETTE APPARATUS

BACKGROUND OF THE INVENTION

1. Field of the Invention

The invention relates to a magnetic-tape-cassette apparatus comprising a servo device for positioning at least one part of the apparatus. The servo device comprises a servo wheel having circumferential teeth around a major portion, and at least one untoothed portion which, in a rest position of the servo wheel, faces a motor-driven gear wheel. The servo wheel carries at least one latching projection as well as a cam which, in the rest position of the servo wheel, is subjected to a starting torque produced by spring force. The servo device further includes a relay-armature member which is pivotable between a latching position and an inoperative position, and which carries a soft iron element which in the rest position of the servo wheel is attracted by an impulse relay to maintain the relayarmature member in the latching position. A stop projection on the relay-armature member cooperates with the latching projection on the servo wheel when the member is in the latching position, to keep the servo wheel latched in the rest position.

After a brief electrical energization of the impulse relay, the relay-armature member is pivoted under spring force from the latching position to the inoperative position, in which the stop projection is clear of the latching projection. Under the influence of the starting torque exerted on the eccentric cam, the servo wheel is then rotated to bring the teeth of the servo wheel into mesh with the gear wheel so that the servo wheel is be driven by the motor to position the desired part of the apparatus. After this the latching projection cooperates with a reset projection on the relay-armature member to return the relay-armature member against the spring force from the inoperative position to the latching position; and the latching projection subsequently abuts the stop projection so that the latter latches the servo wheel in the rest position.

2. Description of the Prior Art

Such a magnetic-tape-cassette apparatus is known from a document published by KISHO-Electronics Co., Ltd. (Japan). The magnetic-tape-cassette apparatus proposed therein comprises a relay-armature member which keeps the servo wheel latched in the rest position under the influence of an impulse relay. Such an impulse relay comprises a permanent magnet which in the latching position of the relay-armature member firmly attracts this member by means of the soft iron element. Around the magnet a coil is arranged to form an electric current source by means of a switch. The construction and arrangement of the electromagnet relative to the permanent magnet is such that the permanent magnet is rendered magnetically neutral while the current source is switched on. As a result, the relayarmature member is no longer attracted and a spring can cause the relay-armature member to be pivoted to the inoperative position, so that the servo wheel is released and can be rotated.

The advantage of such an impulse relay is that the current source need only be switched on for a short time, which is adequate to allow the impulse relay to be rendered magnetically neutral for a short time and the relay-armature member to be pivoted. This brief switching-on has the advantage that the current source of the magnetic-tape-cassette apparatus is loaded only briefly and the impulse relay consumes only a small current. This is not only an advantage for battery-powered apparatus but it is also advantageous for modern microprocessorcontrolled equipment, in which such a brief energization is simple to achieve. Moreover, such an impulse relay can be of compact construction and has only a very small heat dissipation in comparison with a conventional electromagnet.

In the magnetic-tape-cassette apparatus described in this Japanese document the various parts of the relay-armature member have to be positioned accurately relative to the cooperating parts of the servo wheel and the impulse relay in order to ensure that in the latching position, when attracted by the impulse relay, the servo wheel is latched effectively. However, this accurate positioning is difficult to achieve due to the inevitable tolerances of such a servo device, which in practice means that the servo device of the known apparatus is comparatively expensive owing to the accuracy required during manufacture and assembly.

SUMMARY OF THE INVENTION

It is the object of the invention to provide a magnetic-tape-cassette apparatus of the type described in the Field of the Invention with a servo device which is actuated by an impulse relay and which comprises a simple yet effective relay-armature member.

In accordance with the invention the relay-armature member comprises a rigid arm and an elastically deflectable arm which has a free end thereof formed as a rigid support which carries the soft iron element and which is provided with a coupling element. In the latching position of the relay-armature member and during the pivotal movement thereof towards the inoperative position the coupling element abuts the rigid arm and keeps the soft iron element coupled to the rigid arm so that the soft iron element follows the pivotal movement of the rigid arm. At least towards the end of the pivotal return movement of the relay-armature member from the inoperative position of the latching position, after the soft-iron element has again been attracted by the impulse relay, the coupling element is clear of the rigid arm. Then the rigid arm, with a deflectable of the deflexible arm, can perform an additional pivotal movement under the influence of the force exerted on the reset projection by the latching projection.

The magnetic-tape-cassette apparatus in accordance with the invention thus comprises a relay-armature member having a rigid arm and an elastic arm, the coupling of the soft iorn element to the rigid arm ensuring that, during the movement from the latching position to the inoperative position, the soft iron element is rapidly and reliably moved away from the impulse relay through a distance which can be comparatively large, because the rigid arm can have a comparatively large length. Moreover, during the pivotal movement of the relay-armature member from the inoperative position to the latching position, after the soft iron element has again been attracted by the impulse relay, it is possible to pivot the rigid arm slightly further, so that tolerances in the position of the latching projection and the reset projection relative to each other can be compensated for effectively. Thus, even with a less accurate manufacture of the servo device, it can be ensured that in the latching position the soft iron element is correctly positioned against the impulse relay and the servo wheel is latched correctly.

By arranging the elastically deflectable arm substantially parallel to and in the proximity of the rigid arm, this construction occupies hardly any additional space in the magnetic-tape-cassette apparatus. Except for the deflectable arm, the entire relayarmature member is preferably rigid for effectively transmitting to the latching projection the force provided by the spring which acts on the relay-armature member, so that the latching projection can overcome possible friction during the release of the latching projection.

A preferred embodiment of the invention is characterized in that the coupling element is hook-shaped and, viewed in a direction parallel to the pivotal axis of the relay-armature member, extends from the rigid support around the free end of the rigid arm and in the coupled position engages the rigid arm of the relay-armature member at the side thereof which is remote from the rigid support. Thus, the support accurately follows the rigid arm during the pivotal movement to the inoperative position and, after the release of the soft-iron element, if this takes place abruptly, the support cannot move too far because it then abuts the rigid arm. Further, this embodiment can be manufactured effectively in one piece from a plastic material by injection-molding.

In this repsect another preferred embodiment of the invention, in which the relay-armature member further comprises a reset arm carrying the reset projection and a stop arm carrying the stop projection, may be characterized in that the stop projection comprises a stop wall for the latching projection of the servo wheel. This wall extends substantially tangentially relative to an imaginary circle concentric with the pivotal axis of the relay-armature member. This substantially tangential stop wall ensures that the servo wheel is latched effectively in the rest position. In this respect it is important that the relayarmature member can be pivoted through such an angle that the stop wall can be moved away completely from the latching projection.

Preferably, the rigid arm, the deflectable arm with the rigid support and the coupling element, the reset arm and the stop arm are manufactured as an integral unit from a plastic material; and the support comprises retaining portions for retaining the soft-iron element. By the integral manufacture of the various parts of the relayarmature member from a plastic material, this member can be produced simply, cheaply and yet sufficiently accurately, while the retaining portions enable the soft iron element to be mounted easily in the support.

Another preferred embodiment of the invention is characterized in that the servo wheel comprises two latching projections and two untoothed portions and can occupy two different rest positions in such a way that, in the latching position of the relay-armature member, one latching projection abuts the stop projection on the relay-armature member. Subsequently, after electrical energization of the impulse relay in the inoperative position of the relay-armature member, the other latching projection abuts the reset projection on the relay-armature member, causing it to be pivoted back to the latching position. Since the servo wheel can be latched in two different rest positions the part of the apparatus to be positioned by the servo device may occupy a corresponding position. In this way the apparatus part can be set to at least two positions by means of the servo device. As a result of the presence of the two latching projections, these projections can alternately perform the latching function and the reset function for the return movement of the relay-armature member.

Another embodiment of the invention, in which the apparatus comprises a head-mounting plate carrying at least one magnetic head and a pressure roller supported by the pivotable pressure-roller holder, is characterized in that the servo wheel moves the head-mounting plate through a pivotable two-armed actuating lever, which is controlled by the cam on the servo wheel. The head-mounting plate is in a retracted position relative to a magnetic-tape-cassette in a first rest position of the servo wheel, and in an advanced position relative to the magnetic-tape cassette in a second rest position of the servo wheel. The actuating lever pressing against the pressure-roller holder via a pressure spring during the movement of the head-mounting plate towards the advanced position, and pressing directly against the head-mounting plate during the movement towards the retracted position.

Although it is possible to position other parts of the apparatus by means of the servo device, the servo device is particularly suitable for positioning the head-mounting plate and the magnetic heads and pressure roller carried by this plate. In the advanced position the magnetic heads may extend into the cassette, while the pressure roller is positioned against the capstan of the apparatus. In this respect it is advantageous that the pressure spring enables the actuating lever to be pivoted slightly further than necessary for reaching the advanced position of the head-mounting plate. This has the advantage that tolerances in the transmission between the cam and the pressure-roller holder can be compensated for effectively, and the pressure roller is pressed effectively against the capstan, so that no slip can occur between the tape and the pressure roller. As this pressure on the pressure-roller holder is not required in the rearward direction and the head-mounting plate may be positioned less accurately in the retracted position, the actuating lever is coupled directly to the head-mounting plate during the return movement of the plate.

In this respect another preferred embodiment of the invention is characterized in that in the first rest position of the servo wheel the starting torque is exerted on the cam by a projecting element on a spring-loaded brake member which follows the cam, and which brakes turntables of the magnetic-tape-cassette apparatus during the rotation of the servo wheel from the second to the first rest position under the influence of the force exerted on the projecting element by the cam. Thus, after it has been released from the relay-armature member, the servo wheel is capable of starting rapidly in order to be driven by the rotor. This has the advantage that no special part is required for starting, but that it is adequate to use a projecting element on the brake member, which is actuated by the cam during rotation of the servo wheel. Further, in addition to the head-mounting plate the servo device can position a further part of the apparatus part constituted by the brake member of the apparatus. By utilizing the force exerted on the actuating lever by the pressure spring it is also possible to obtain a starting torque on the cam in the second rest position of the servo wheel.

A further preferred embodiment of the invention is characterized in that the servo wheel can move the head-mounting plate into first and second advanced positions relative to a magnetic-tape cassette, the servo wheel being driven by a first motor which rotates constantly. A second motor controls the pivotal movement of a pivotal arm carrying a stop projection. An abutment on the head-mounting plate abuts the stop projection when the second motor is energized at an instant prior to the electrical energization of the impulse relay, during the movement of the head-mounting plate from the retracted position to an operative pivotal position of the stop projection, so that in its operative position, the stop projection defines the second advanced position of the headmounting plate, and by electrically energizing the impulse relay at an instant before the second motor is switched on, the stop projection assumes an inoperative position relative to the abutment on the head-mounting plate and the head-mounting plate can be moved to the first advanced position which is more advanced relative to the magnetic-tape cassette than the second advanced position. Thus, by a suitable choice of the instants at which the second motor and the impulse relay are energized, the head-mounting plate can be moved from the retracted position to two different advanced positions by means of one servo device. By using the first motor for driving the flywheel and the capstan, which is connected to this flywheel, and by using the second motor for driving the turntables, this construction enables the tape deck to be actuated by means of the two motors and the impulse relay. This results in a simple and compact construction. Preferably, the second motor and the pulse relay are switched at the appropriate instants by means of a microprocessor circuit.

A magnetic-tape-cassette apparatus embodying the invention will be described in more detail, by way of example, with reference to the accompanying drawings.

BRIEF DESCRIPTION OF THE DRAWING

FIG. 3 is a schematic plan view showing the servo device in a first rest position, FIG. 4 is a schematic plan view showing the servo device in the first rest position of FIG. 3 and a part of the head-mounting plate and a brake member.

DESCRIPTION OF THE PREFERRED EMBODIMENT

The Tape Drive

Figure 1:
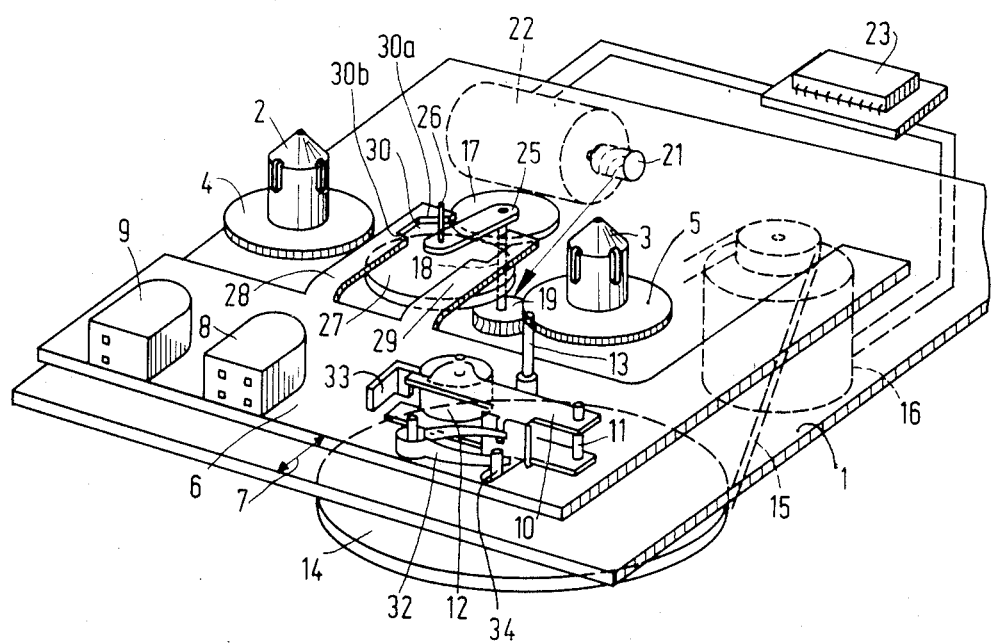
FIG. 1 is a perspective plan view of the relevant part of a magnetic-tape-cassette apparatus in accordance with the invention.

The magnetic-tape-cassette apparatus shown in FIG. 1 comprises a deck plate 1, in which two winding spindles 2 and 3 are mounted for rotation. At their lower ends the winding spindles 2 and 3 are each connected coaxially a turntable 4 and 5 respectively, provided with circumferential teeth. A head-mounting plate 6 is guided on the deck plate 1 for rectilinear movement in directions indicated by the double arrow 7. In a manner to be described hereinafter, the head-mounting plate 6 can occupy a retracted position relative to the winding spindles and a magnetic-tape cassette, not shown, mounted on these spindles; and from this position the head-mounting plate can be moved to a first or a second advanced position, the distance of the head-mounting plate from the winding spindles 2 and 3 being smaller in the first advanced position than in the second advanced position.

Figure 6:
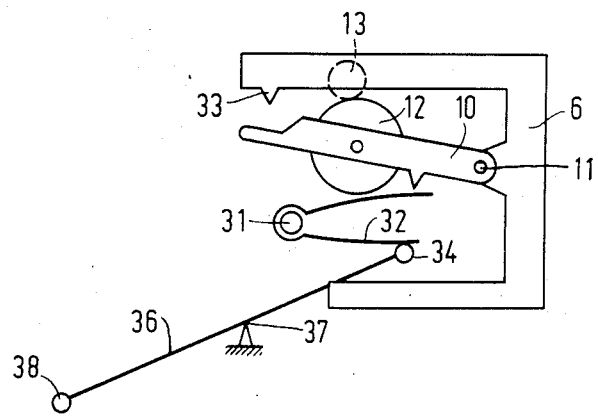
FIG. 6 is a schematic plan view showing a part of the head-mounting plate in an advanced position, and the actuating member which cooperates with this plate.

The head-mounting plate 6 carries two magnetic heads 8 and 9, of which the magnetic head 8 is a combined recording/playback head and the magnetic head 9 is an erase head in the present embodiment. In addition, a pressure-roller lever 10 is mounted on the head-mounting plate 6 so as to be pivotable about a spindle 11 which is secured to the upper side of the deck plate 1. At the end portion which is remote from the spindle 12 the pressure-roller lever 10 carries a pressure roller 12 which in the position shown in FIG. 6 is urged against a capstan 13. This is in the first advanced position of the head-mounting plate 6. In the second, less advanced, position of this plate the pressure roller 12 is clear of the capstan 13. The capstan 13 is supported in the deck plate 1 and beneath this plate it is connected to a flywheel 14 which is driven by a first motor 16 via a belt 15.

Adjacent the space between the turntables 4 and 5 a drive gear 17 is fixed on a shaft 18. Underneath the deck plate 1 the shaft 18 carries a worm wheel 19 which meshes with a worm 21 which is driven by a second motor 22. The motors 16 and 22 are electrically connected to a microprocessor circuit 23, by means of which circuit the two motors can be switched on and off and the direction of rotation of the motors 22 can be reversed. Further, the microprocessor circuit 23 is electrically connected to an impulse relay 44, to be described in more detail hereinafter (see FIGS. 2, 3 and 5).

Above the drive gear 17 the shaft 18 further carries a pivotal arm 25, whose end portion which is remote from the shaft carries a stop projection in the form of a pin 26. An idler gear 27 is journalled on the lower end of the pin 26, and is arranged to mesh with drive gear 17 continuously. The gear 27 is located in the space between the turntables 4 and 5. In a manner not shown, the pivotal arm 25 is connected to a friction spring (not shown) having a free end which presses in a radial direction against a portion of the idler gear. The spring controls the pivotal movement of the arm 25 about the shaft 18 as a result of the friction torque exerted on the idler gear 27 at the instant at which the direction of rotation of the motor 22, and thus of the gear 27, is reversed. Thus, by pivoting the pivotal arm 25 the idler gear 27 can be coupled to the turntable 4 or 5 to drive it. In the manner described in the foregoing the direction of the pivotal movement depends on the direction of rotation of the second motor 22. Thus, when there is a magnetic-tape cassette on the apparatus, the magnetic tape in the cassette can be wound by the motor 22 via the winding spindle 2 or 3. The motor 22 is constructed in such a way that, during recording and playback, winding is effected at a comparatively low speed. During fast winding the tape is moved at a comparatively high speed.

Projecting from the head-mounting plate 6 on opposite sides of the stop pin 26 are two mutually parallel limbs 28 and 29 which are constructed and arranged mirrorsymmetrically relative to a plane perpendicular to the deck plate 1 and parallel to the arrow 7. Therefore, only the left-hand limb 28 will be described. The limb extends from the head-mounting plate 1 in the direction of movement of the plate towards its advanced positions. Adjacent its free end the limb has a recess 30 with a wall 30a which is inclined relative to the direction of movement of the plate and a stop wall 30b. When the second motor 22 is started prior to the movement of the head-mounting plate 6 towards the winding spindles 2 and 3, the stop projection pin 26 will enter the recess 30 in the limb 28 or 29 (depending on the direction of rotation of the motor 22), so that when the head-mounting plate 6 moves towards the winding spindles 2 and 3 the stop wall 30b will abut the stop projection 26. Thus, by first starting the second motor 22 and subsequently shifting the head-mounting plate 6 via the microprocessor circuit 23, the head-mounting plate 6 will assume the second advanced position described above, because further advance is blocked by the stops 26, 30b. In this position the idler gear 27 is in engagement with the turntable 4 or 5 and fast-winding of the magnetic tape onto the winding spindle 2 or 3 is possible, depending on the direction of rotation of the motor 22. For a more detailed description of the operation of the drive mechanism of these turntables and the manner in which the pivotal arm 25 is pivoted to cooperate with the limbs 28 and 29, reference is made to the Applicants Netherlands Patent Application No. 8304313 filed on 12.15.83 to which co-pending U.S. patent application Ser. No. 679,189 filed Dec. 7, 1984 corresponds.

Figure 2:
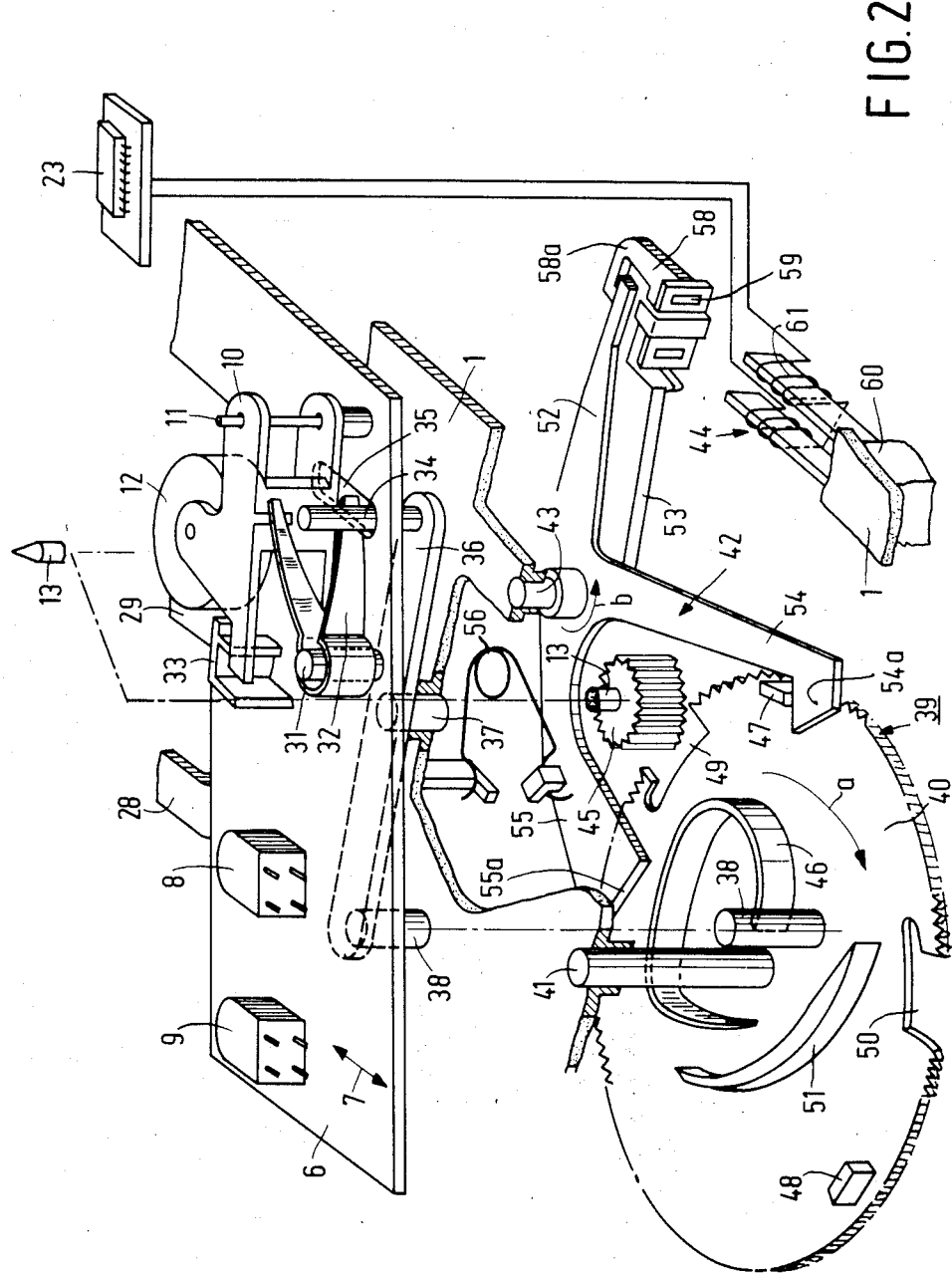
FIG. 2 is an enlarged-scale exploded view of the head-mounting plate and the associated servo device of the magnetic-tape-cassette apparatus shown in FIG. 1.

As shown at an enlarged scale in FIG. 2, a substantially U- or V- shaped blade spring 32 which is mounted on a pin 31 on the head plate 6 exerts pressure on the pressure-roller lever 10, clockwise toward the capstan 13. An abutment 33 is arranged on the head-mounting plate 6 to limit the pivotal movement of the pressure-roller lever about the spindle 11 in a clockwise direction under the influence of the spring 32. One limb of the spring 32 bears against the pressure-roller lever 10 and the other limb bears against a pin 34 which is guided in a slot 35 in the head-mounting plate 6. The pin 34 is mounted at the free end of one arm of a two-armed actuating lever 36 which is pivotable about a pivot 37 connected to the deck plate 1. At the free end of the other arm the actuating lever 36 carries a pin 38 which extends through the deck plate to a servo device 39, which is situated underneath the deck plate and which will be described in more detail hereinafter.

The Servo Device

The servo device 39 comprises primarily a servo wheel 40 which cooperates with an impulse relay 44 and an armature member 42. The servo wheel 40 is journalled in the deck plate 1 by means of a spindle 41. The relay armature member 42 is pivotable about a spindle 43 mounted on the underside of the deck plate 1 and magnetically engaged at certain times by the impulse relay 44, which is also secured to the underside of the deck plate 1. The servo wheel can be driven by a gear wheel 45, which is rigidly mounted on the spindle of the flywheel 14 and which can thus be driven by the first motor 16. This causes the gear wheel 34 to rotate in the direction indicated by the arrow a in FIG. 3.

As shown in FIG. 3 the servo wheel 40 carries a cam 46 which is disposed eccentrically around the spindle 41, and two latching projections 47 and 48 which are spaced from each other at an angle of approximately 140° about the spindle 41. The servo wheel 40 is provided with circumferential teeth and has two recesses 49 and 50 in its periphery, spaced at an angle of 140° from each other, where the wheel is untoothed. Due to the presence of the two latching projections 47 and 48 the servo wheel 40 can occupy a first rest position (see FIG. 3) or a second rest position (see FIG. 5) in which the recess 49 or 50 respectively is situated opposite the gear wheel 45 with the result that the gear wheel cannot drive the servo wheel. The servo wheel 40 further carries a ridge 51 which is also disposed eccentrically relative to the spindle 41.

The relay-armature member 42 has four arms: a rigid arm 52, an elastically deflectable arm 53, a stop arm 54 and a reset arm 55. The reset arm 55 is loaded by a spring 56 which is connected to the deck plate 1 and constantly tends to pivot the relay-armature member 42 about the spindle 43 in the direction indicated by the arrow b. The free end of the arm 55 is shaped as a reset projection 55a, located near the circumference of the servo wheel 40, formed by two convergent walls forming an angle with each other. At its free end the stop arm 54 carries a stop projection 54a which is constructed as a hook and has a stop wall which is disposed substantially tangentially relative to an imaginary circle concentric with the spindle 43 for abutment with the latching projection 47 or 48.

Figure 5:
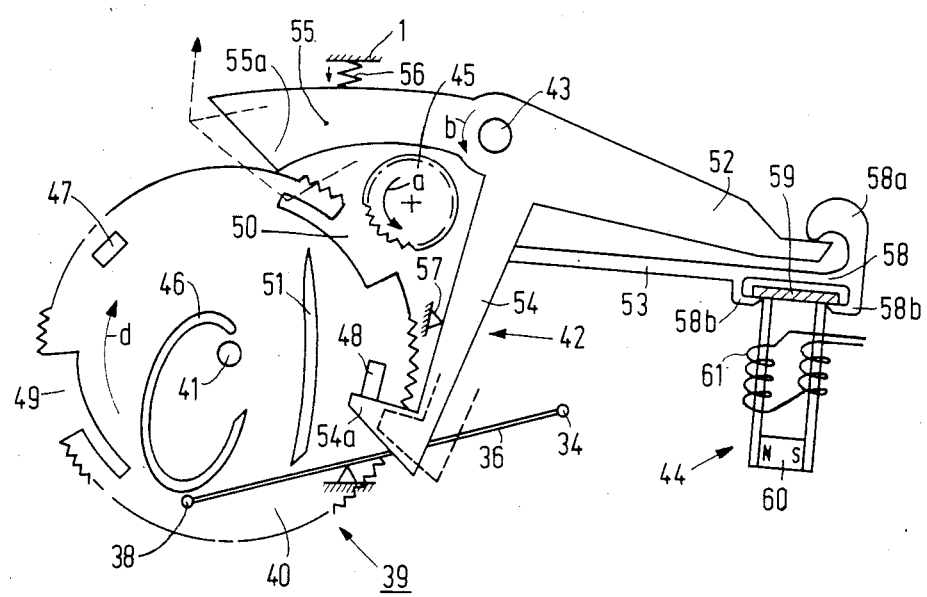
FIG. 5 is a schematic plan view showing the servo device in a second rest position.

In the rest positions shown in FIGS. 3 and 5 the latching projections 47 and 48 respectively abut the stop projection 54a so that the servo wheel 40 is latched in the respective rest position. In this position the stop arm 54 abuts a stop 57 on the deck plate 1, to define the position of the relay-armature member 42 in the latching position. At its free end deflectable arm 53 is formed as a rigid support 58 including a coupling element 58a which is hook-shaped and, viewed in a direction parallel to the spindle 43, extends around the free end of the rigid arm 52 and in the coupled position shown in FIG. 3 engages that side of the rigid arm 52 which is remote from the support 58. Further, the support 58 including retaining portions 58b which serve to retain a plate-shaped soft iron element 59. In the latching position of the relayarmature member, as shown in FIGS. 3 and 5, the soft iron element is drawn against the impulse relay 44.

The impulse relay 44 comprises a permanent magnet 60 and two limbs around which two coils 61 are wound. Consequently, the relay 44 comprises both a permanent magnet and an electromagnet, whose coils are connected to a current source, not shown, under control of the microprocessor circuit 24. The impulse relay 44 is arranged so that when the coils 61 are not connected to the current source the magnet 60 constantly attracts the soft-iron element 59 as a result of its permanent magnetism. In the latching position the relay-armature member 42 is kept firmly in position by means of the stop 57 and impulse relay 44. A brief energization of the coils 61, which can be achieved by means of an electrical impulse, causes the permanent magnetism of the magnet 60 to be neutralized by the elecromagnet, so that the soft iron element 59 is no longer attracted. The spring 56 then causes the relay-armature member 42 to pivot about the spindle 43 in the direction indicated by the arrow b. It is to be noted that the relay-armature member comprising the four arms 52 to 55 may be made in one piece from a plastic material, so that for assembly only the soft iron element 59 has to be fitted between the retaining portions 58b. By means of the coupling element 58a the soft iron element 59 is pivoted with the relay-armature member when this member pivoted in the direction indicated by the arrow b. When the relayarmature member 52 is pivoted in the direction opposite to that indicated by the arrow b, due to the flexibility of the arm 53, thr rigid arm 52 can be pivoted slightly further after the soft iron element 59 has been engaged by the magnet 60. This will be described in more detail hereinafter.

As shown in FIG. 4, a brake member 62 is guided in the deck plate 1 so as to be slidable towards and away from the turntables 4 and 5, a spring 63 constantly urging the brake member 62 away from the turntables 4 and 5. The brake member 62 carries a projecting element 64 which is guided in a slot 65 in the deck plate 1. In the first rest position of the servo wheel 40 the free end of the element 64 presses against the cam 46 under the influence of the spring 63 and exerts a starting torque (arrow c) which tends to rotate the wheel 40 about the spindle 41 in the direction indicated by the arrow d. As long as the stop projection 54a on the relay-armature member 42 is in engagement with the latching projection 47, this starting torque c can have no effect. However, if as a result of the pulse-wise energization of the impulse relay 44 the soft iron element 59 is no longer attracted, the relay armature 42 can pivot about the spindle 43 in the direction indicated by the arrow b. In this respect it is advantageous that the relay armature 42 is rigid except for the deflectable arm 53, so that the friction between the stop projection 54a and the latching projection 47 can be compensated for effectively. After the release of the servo wheel 40 the starting torque (arrow c) can rotate the servo wheel to bring the circumferential teeth of the servo wheel into mesh with the gear wheel 45, which is driven by the motor 16, so that the servo wheel is rotated further in the direction indicated by the arrow d as a result of the rotation of the gear wheel 45 in the direction indicated by the arrow a.

Depending on the distance through which the head-mounting plate 6 is to be moved, the second motor 22 has not yet been started at the instant at which the impulse relay 44 is energized if the plate is to be moved to the first advanced position; if the plate is to be moved to the less advanced second position the second motor 22 should be started before the impulse relay is electrically energized. During rotation of the servo wheel 40 the actuating lever 36 is moved into the position shown in FIGS. 5 and 6 by the cam 46. The lever can assume this position because the latching projection 48, as is also shown in FIG. 5, has first engaged the reset projection 55a on the relay-armature member 42 and thereby pivotally reset this member from the inoperative position shown in broken lines to the latching position. Subsequently, after the final part of the rotation of the latching projection 48, this projection abuts the stop projection 54a on the relay-armature member 42, so that the servo wheel 40 is not latched in the second rest position. In this position the recess 50 in the servo wheel 40 is disposed opposite the gear wheel 45, so that a further rotation of the gear wheel 45 has no effect on the servo wheel 40.

During the pivotal movement of the actuating lever 36 by the cam 46, pressure is exerted on the spring 32 via the pin 34, so that this spring presses against the pressure-roller lever 10. As a result of this force, since the pressure-roller lever 10 abuts the abutments 33, the head-mounting plate 6 is advanced to the first or the second advanced position (which as already stated depends on whether the second motor 22 has or has not been switched on before the impulse relay is energized). In the first advanced position the pressure roller 12 now presses against the capstan 13, with the result that the pin 34 moves slightly further than the headmounting plate 6, so that there is sufficient pressure on the pressure roller 12. This has the advantage of compensating effectively for possible tolerances in the transmission between the cam 46 and the head-mounting plate 6. From the instant at which the pressure roller 12 presses against the capstan 13 recording or playback may commence and the tape may be wound towards the winding spindle 3.

When the end of the tape is reached or if a stop button, not shown, is actuated, the impulse relay 44 is re-energized. As a result of this, the relay-armature member is again moved from the latching position to the inoperative position, while in addition the latching projection 48 is disengaged from the stop projection 54a. In this situation the actuating lever 36 presses against the cam 46 in such a way that the pressure exerted on the actuating lever 36 by the spring 32 produces a starting torque on the cam, so that after release of the relay-armature member 42 the servo wheel 40 can rotate further in the direction indicated by the arrow d, so that the circumferential teeth on the servo wheel can again mesh with the gear wheel 45. As a result of this, the servo wheel is again driven, the pin 38 being guided between the cam 46 and the ridge 41 so that the actuating lever 36 is pivoted back in a clockwise direction about the spindle 37. This results in the pin 34 pressing directly against the end wall of the slot 35 in the head mounting plate 60, so that this plate is moved towards the retracted position in the direction indicated by the arrow 7.

When the servo wheel 40 begins to rotate, the cam 46 exerts a force on the projecting element of the brake member 62 such that the brake member is briefly moved towards the turntables 4 and 5. Consequently, during the rotation of the servo wheel 40 the brake member is actuated and the turntables 4 and 5 are braked. During the rotation in the direction indicated by the arrow d, the latching projection 47 cooperates with the reset projection 55a on the relay-armature member 42 to return this member from the inoperative position to the latching position (see FIG. 3). Subsequently, the latching projection 47 again abuts the stop projection 54a so that the servo wheel again occupies the first rest position shown in FIG. 3. In this way the servo wheel can be moved from a first rest position (FIG. 3) to a second rest position (FIG. 5) and back again to the second rest position (FIG. 3). The head-mounting plate 6 is then moved from the retracted position to one of the advanced positions and back to the retracted position, while during the return movement of the head-mounting plate the brake member 62 is actuated to brake the turntables.

The construction described above has the advantage that the relay-armature member, which cooperates with the impulse relay, need be energized only briefly in order to enable the servo wheel to be released. As a result of this pulsewise energization only a small current will flow in the coil 61, and the heat dissipation is minimal. This is of particular advantage in compact battery-powered equipment or equipment controlled by microprocessor circuits. The construction of the relay armature member 42 enables tolerances in the servo device to be compensated for effectively. Resetting of the relay armature member 42 from the inoperative position to the latching position is always effected over a distance which is slightly larger than strictly necessary, and the excess pivotal movement of the rigid arm 52 of the member 42 ensures that the soft iron element 59 is correctly positioned against the magnet 60. Further it is thus possible to bridge a comparatively large distance between the soft iron element 39 and the impulse relay.

It is to be noted that the present servo device is not limited to the actuation of a head-mounting plate and a brake member. It is obvious that the servo device may also be employed for actuating other parts of a magnetic-tape-cassette apparatus, such as shifting gear wheels, turning a magnetic head, and inserting and ejecting a magnetic-tape cassette.

What is claimed is:

1. A magnetic-tape-cassette apparatus comprising a servo device for positioning at least one part of the apparatus, which servo device comprises:

a servo wheel having circumferential teeth and at least one untoothed portion which faces a motor-driven gear wheel in a rest position of the servo wheel, the servo wheel carrying at least one latching projection as well as a cam which is subjected to a starting torque produced by spring force in the rest position of the servo wheel, a relay-armature member which is pivotable between a latching position and an inoperative position and which carries a soft iron element, and an impulse relay arranged to attract said soft iron element when the servo wheel is in the rest position, to maintain the relay-armature member in the latching position, in which position a stop projection on the relay-armature member cooperates with the at least one latching projection on the servo wheel to keep the servo wheel latched in the rest position; while after a brief electrical energization of the impulse relay the relay-armature member is pivoted under spring force from the latching position to the inoperative position, in which inoperative position the stop projection is clear of the latching projection and, under the influence of the starting torque exerted on the eccentric cam, the servo wheel is is rotated to bring the teeth of the servo wheel into mesh with the gear wheel so that the servo wheel is driven by the motor to position said part of the apparatus, after which the latching projection cooperates with a reset projection on the relay-armature member to return the relay-armature member against said spring force from the inoperative position to the latching position, the latching projection subsequently abutting the stop projection so that the latter latches the servo wheel in the rest position, characterized in that the relay armature member comprises a rigid arm and an elastically deflectable arm which at a free end thereof comprises a rigid support which carries the soft iron element, said deflectable arm including a coupling element which in the latching position of the relay-armature member and during the pivotal movement thereof towards the inoperative position abuts the rigid arm and keeps the soft iron element coupled to the rigid arm so that the soft iron element follows the pivotal movement of the rigid arm, said coupling element, at least the end of the pivotal return movement of the relay-armature member from the inoperative position to the latching position, after the soft iron element has again been attracted by the impulse relay, being clear of the rigid arm, after which said rigid arm, with a deflection of the deflectable arm, can perform an additional pivotal movement under the influence of the force exerted on the reset projection by the latching projection.

2. A magnetic-tape-cassette apparatus as claimed in claim 1, characterized in that the coupling element is hook-shaped and, viewed in a direction parallel to the pivotal axis of the relay-armature member, extends from the rigid support around the free end of the rigd arm in the coupled position and engages the rigid arm of the relay-armature member at the side thereof which is remote from the rigid support.

3. A magnetic-tape-cassette apparatus as claimed in claim 2, in which the relay-armature member further comprises a reset arm carrying the reset projection and a stop arm carrying the stop projection, characterized in that the stop projection comprises a stop wall for the latching projection of the servo wheel, said stop wall extending substantially tangentially relative to an imaginary circle concentric with the pivotal axis of the relay-armature member.

4. A magnetic-tape-cassette apparatus as claimed in claim 3, in which the rigid arm, the deflectable arm with the rigid support and the coupling element, the reset arm and the stop arm are manufactured as an integral unit from a plastic material; and the support comprises retaining portions for retaining the soft iron element.

5. A magnetic-tape-cassette apparatus as claimed in any one of the preceding claims, characterized in that the servo wheel comprises two latching projections and two untoothed portions, and can occupy two different rest positions in such a way that in the latching position of the relay-armature member one latching projection abuts the stop projection on the relay-armature member and subsequently, after electrical energization of the impulse relay in the inoperative position of the relay-armature member, the other latching projection abuts the reset projection on the relay-armature member, causing it to be pivoted back to the latching position.

6. A magnetic-tape-cassette apparatus as claimed in claim 5, in which the apparatus comprises a head-mounting plate carrying at least one magnetic head and a pressure roller supported by the pivotable pressure-roller holder, characterized in that the servo wheel moves the head-mounting plate through a pivotable two-armed actuating lever, which is controlled by the cam on the servo wheel, the head-mounting plate being in a retracted position relative to a magnetic-tape cassette in a first rest position of the servo wheel, and in an advanced position relative to the magnetic-tape cassette in a second rest position of the servo wheel, the actuating lever pressing against the pressure-roller holder via a pressure spring during the movement of the head-mounting plate towards the advanced position and pressing directly against the head-mounting plate during the movement towards the retracted position.

7. A magnetic-tape-cassette apparatus as claimed in claim 6, characterized in that in the first rest position of the servo wheel the starting torque is exerted on the cam by a projecting element on a spring-loaded brake member which follows the cam and which brakes turntables of the magnetic-tape-cassette apparatus during the rotation of the servo wheel from the second to the first rest position under the influence of the force exerted on the projecting element by the cam.

8. A magnetic-tape-cassette apparatus as claimed in claim 7, characterized in that the second rest position of the servo wheel the starting torque is exerted on the cam by the actuating lever under the influence of the forces exerted by the pressure spring between this lever and the pressure-roller holder.

9. A magnetic-tape-cassette apparatus as claimed in claim 6, characterized in that the servo wheel can move the head-mounting plate into first and second advanced positions relative to a magnetic-tape cassette, the apparatus comprises a first motor which rotates constantly for driving the servo wheel, and a second motor for controlling the pivotal movement of a pivotal arm carrying a stop projection, an abutment on said head-mounting plate abuts the stop projection when the second motor is energized at an instant prior to the electrical energization of the impulse relay during the movement of the head-mounting plate from the retracted position to an operative pivotal position of the stop projection, so that in its operative position, said stop projection defines the second advanced position of the head-mounting plate, and by electrically energizing the impulse relay at an instant before the second motor is switched on, the stop projection assumes an inoperative position relative to the abutment on the head-mounting plate and the head-mounting plate can be moved to the first advanced position which is more advanced relative to the magnetic-tape cassette than the second advanced position.

* * * * *

UNITED STATES PATENT AND TRADEMARK OFFICE
CERTIFICATE OF CORRECTION

PATENT NO. : 4,665,451

DATED : May 12, 1987

INVENTOR(S) : GHISLANUS M.A.M. ALDENHOVEN

It is certified that error appears in the above-identified patent and that said Letters Patent is hereby corrected as shown below:

IN THE CLAIMS

Claim 1, line 50 (column 11, line 63) after "least" insert --towards--

Claim 2, line 5 (column 12, line 9) change "rigd" to --rigid--

Claim 8, line 2 (column 12, line 67) after " in that" insert --in--

Signed and Sealed this

Nineteenth Day of April, 1988

Attest:

DONALD J. QUIGG

*Attesting Officer*  *Commissioner of Patents and Trademarks*